United States Patent Office 3,757,003
Patented Sept. 4, 1973

3,757,003
PROCESS FOR PREPARING L-PYROGLUTAMYL-L-HISTIDYL-L-PROLINAMIDE
Karl Folkers and Jaw-Kang Chang, Austin, Tex., assignors to Karl Folkers, Austin, Tex.
No Drawing. Filed Dec. 18, 1969, Ser. No. 886,351
Int. Cl. C07c 103/52; C07g 7/00
U.S. Cl. 260—112.5         3 Claims

ABSTRACT OF THE DISCLOSURE

A synthetically produced tripeptide, L-glutaminyl-L-histidyl-L-prolinamide, can be readily cyclized to provide the tripeptide, L-pyroglutamyl-L-histidyl-L-prolinamide which exhibits the specific and nanogram-activity, in vivo, of the thyrotropin releasing hormone of the hypothalamus gland of mammalian species and which is obtained as a crystalline sulfate and free base.

This invention relates to a new, biologically significant, synthetically produced compound, L-glutaminyl-L-histidyl-L-prolinamide and its conversion to L-pyroglutamyl-L-histidyl-L-prolinamide, which exhibits the same hormonal activity and potency of the thyrotropin releasing hormone (TRH) of the hypothalamus gland. More particularly, this invention relates to the use of a readily commercially available compound, L-glutamine, in the synthesis of the invention.

BACKGROUND OF THE INVENTION

In co-pending application Ser. No. 859,559, filed Sept. 19, 1969, there is disclosed and described a method for converting an inactive and free tripeptide, α-glutamyl-histidyl-proline, to the amide form by reacting the dimethyl ester derived from the free tripeptide with methanol and ammonia to obtain (pyro) glutamyl-histidyl-prolinamide which exhibits the same hormonal activity and potency of the TRH of the hypothalamus gland of mammalian species.

More recently there has been disclosed and described a method for synthesizing the tripeptide, L-(pyro) glutamyl-L-histidyl-L-prolinamide, from three amino acids by reacting two of the three amino acids to obtain a corresponding dipeptide and then reacting the dipeptide with the remaining, unreacted amino acid to obtain the synthetic tripeptide. The synthesis can be accomplished by utilizing the amino acids in either their protected or unprotected form to obtain a product of high purity and this synthetically produced tripeptide was also found to exhibit the same hormonal activity and potency as the TRH of the hypothalamus gland of mammalian species.

THE INVENTION

It has now been found, in accordance with the present invention, that a new, synthetically produced tripeptide, having a glutaminyl amino acid moiety and a terminal prolinamide moiety therein, L-glutaminyl-L-histidyl-L-prolinamide, can be readily cyclized to obtain the hormonally active tripeptide, L-pyroglutamyl-L-histidyl-L-prolinamide. In the method of synthesizing the novel tripeptide of the invention, glutamine is employed since it is readily, commercially available and permits chemical advantage to be taken of its intrinsic capacity of an open glutaminyl moiety so that it can be easily cyclized to the stable pyroglutamyl moiety.

The novel tripeptide of the invention is obtained not only as a crystalline free base, but as a crystalline sulfate and this crystalline salt is useful for purification and for general chemical and biomedical purposes.

The chemical intermediates, reactions and products of this invention are generally, schematically depicted in Scheme I below and the ensuing description of the invention will be more clearly understood when considered with reference to Scheme I.

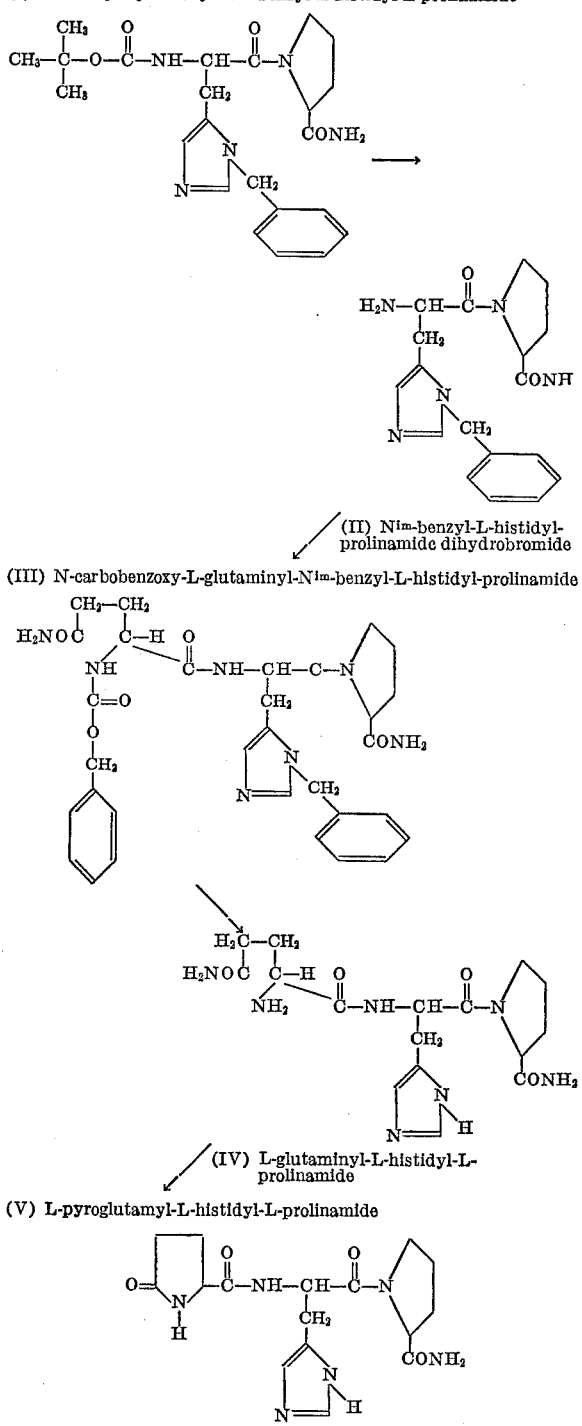

In accordance with the present invention and with reference to Scheme I above, the dipeptides N-t-butyloxycarbonyl-$N^{im}$-benzyl-L-histidyl-L-prolinamide (I), was obtained in 75% yield by the coupling of N-t-butyloxycarbonyl-$N^{im}$-benzyl-L-histidine and prolinamide by the dicyclohexylcarbodiimide method. Upon treatment of this protected dipeptide (I) with hydrogen bromide in glacial acetic acid, the t-butyloxycarbonyl protecting group is removed to obtain $N^{im}$-benzyl-L-histidyl-L-prolinamide dihydrobromide (II) in 72% yield which was then coupled with N-carbobenzoxyglutamine using the mixed anhydride method to afford N-carbobenzoxy-L-glutaminyl-$N^{im}$-benzyl-L-histidyl-L-prolinamide (III). Upon hydrogenation of this protected tripeptide (III) in absolute ethanol using 5% palladium on charcoal as catalyst and treatment of the product with hydrogen bromide, there is obtained L-glutaminyl-L-histidyl-L-prolinamide (IV) dihydrobromide which was then treated with hot glacial acetic acid or refluxing hot ammonia solution to provide the tripeptide L-pyroglutamyl-L-histidyl-L-prolinamide (V).

As previously indicated, synthesis of the tripeptide, L-pyroglutamyl-L-histidyl-L-prolinamide (V), from the protected forms of the dipeptides, N-t-butyloxycarbonyl-$N^{im}$-benzyl-L-histidyl-L-prolinamide (I) and $N^{im}$-benzyl-L-histidyl-L-prolinamide dihydrobromide (II), has been disclosed and described.

The following examples are now set forth to illustrate the unique and commercially feasible method of synthesizing both the tripeptides L-glutaminyl-L-histidyl-L-prolinamide (IV) and L-pyroglutamyl-L-histidyl-L-prolinamide (V) in accordance with the present invention and of obtaining the crystalline tripeptide as a free base and a crystalline sulfate, it being understood that these illustrations are merely exemplary and are not intended to be, nor should they be construed as being, limitative of the invention. In the examples, the structural formulas relating to the starting materials, reactions, and products correspond to those illustrated in Scheme I above. The terms and symbols employed in the examples and throughout the application and in the appended claims are identified and defined as follows:

| Term/symbol: | Identification/definition |
|---|---|
| "TLC" | Chromatographic evaluation. |
| "CDCl$_3$" | Deuteritic chloroform. |
| "R$_f$" | Chromatographic values. |
| "BOC" | Butyloxycarbonyl. |
| "Bzl" | Benzyl. |
| "Cbz" | Carbobenzoxy. |
| "Gln" | Glutaminyl. |
| "Glu" | Glutamyl. |
| "His" | Histidyl. |
| "Pro" | Proline. |

EXAMPLE I

Preparation of N-carbobenzoxy-L-glutaminyl-$N^{im}$-benzyl-L-histidyl-L-prolinamide (III)

280 mg. of N-carbobenzoxy-L-glutamine prepared as described by C. Ressler and H. Ratzkin, Journal of Organic Chemistry, vol. 26, p. 3356 (1961) in 10 ml. dry tetrahydrofuran was magnetically stirred at 0° C. and was then added successively with 0.2 ml. triethylamine and 0.15 ml. ethyl chloroformate and, after one hour, 500 mg. $N^{im}$-benzyl-L-histidyl-L-prolinamide dihydrobromide and 0.14 ml. triethylamine in 10 ml. chloroform. After being stirred at room temperature for 24 hours, the solvent was evaporated in vacuo and the reaction mixture was added into 50 ml. water which was extracted with chloroform (3× 50 ml.). The extract was dried using magnesium sulfate, filtered and then evaporated to obtain 330 mg. of the oily, protected, tripeptide N-carbobenzoxy - L - glutaminyl-$N^{im}$-benzyl-L-histidyl-L-prolinamide (III) which was found to be homogeneous in TLC (silica gel) and chlorine/tolidine positive.

Analysis of this tripeptide in τ CDCl$_3$ was found to be as follows:

4.99 p.p.m. (N-methylene protons of the benzyl group and methylene protons of the benzyloxy group, 4 protons).

2.75 p.p.m. (aromatic protons, 10 protons).

EXAMPLE II

Preparation of L-glutaminyl-L-histidyl-L-prolinamide (IV)

100 mg. of N-carbobenzoxy-L-glutaminyl-$N^{im}$-benzyl-L-histidyl-L-prolinamide (III), obtained as in Example I above, in 20 ml. absolute ethanol containing 5% palladium/charcoal (50 mg.) as catalyst was hydrogenated for 48 hours at room temperature and a pressure of one atmosphere. The reaction mixture was filtered and then evaporated to obtain 47 mg. of the pure tripeptide, L-glutaminyl-L-histidyl - L - prolinamide (IV), which was treated with saturated hydrogen bromide in ethanol at room temperature. The resultant dihydrobromide was precipitated by addition of ether and was found to be homogeneous in TLC (silica gel) as well as ninhydrin, Pauly, and chlorine/tolidine positive. A 1 mg. portion of this was then hydrolyzed with 2 ml. 6 N-hydrochloric acid and, after being stirred at refluxing temperature for 24 hours, the reaction mixture was evaporated in vacuo to give the free amino acids: Glutamic acid, histidine and proline which were confirmed on the TLC plate (silica gel).

EXAMPLE III

Conversion of L-glutaminyl-L-histidyl - L - prolinamide (IV) to L-pyroglutamyl - L-histidyl-L-prolinamide (V) by acetic acid Approximately 1 mg. of L-glutaminyl-L-histidyl-L-prolinamide (IV) dihydrobromide, obtained according to Example II above, in 0.5 ml. glacial acetic acid was heated so as to reflux for 2 minutes. The reaction mixture was then evaporated to provide the L-pyroglutamyl-L-histidyl-L-prolinamide (V) which was found to be homogeneous in TLC (silica gel), ninhydrin negative and Pauly and chlorine/tolidine positive. The R$_f$ values were found to be identical with the corresponding compound derived in accordance with the procedures disclosed in our co-pending application.

EXAMPLE IV

Conversion of L-glutaminyl - L - histidyl-L-prolinamide to L-pyroglutamyl - L - histidyl-L-prolinamide (V) by methanolic ammonia About 1 mg. of L-glutaminyl-L-histidyl-L-prolinamide (IV) dihydrobromide, obtained as in Example II above, in 1 ml. methanol and 30% ammonia solution (ca. 0.2 ml.) was heated so as to reflux for 2 hours. The reaction mixture was evaporated to provide the L-pyroglutamyl-L-histidyl-L-prolinamide (V) and was again found to be homogeneous in TLC (silica gel), ninhydrin negative, and Pauly and chlorine/tolidine positive, and whose R$_f$ values were also found to be identical with the corresponding tripeptide as identified in Example III.

EXAMPLE V

Conversion of L-glutaminyl - L - histidyl-L-prolinamide (IV) to L-pyroglutamyl - L - histidyl-L-prolinamide (V) by 0.1% acetic acid-n-butanol-pyridine About 1 mg. L-glutaminyl-L-histidyl-L-prolinamide (IV) dihydrobromide in 3 ml. (0.1%) acetic acid-n-butanol-pyridine (respective ratio of 11:5:3) was allowed to stand at room temperature for 3 days. The reaction mixture was then evaporated to provide the L-pyroglutamyl-L-histidyl-L-prolinamide (V) whose TLC showed 60% conversion and which was found to be identical with the corresponding tripeptide as identified in Example III.

EXAMPLE VI

Crystallization of L-pyroglutamyl-L-histidyl-L-prolinamide (V)

680 mg. of L-pyroglutamyl-L-histidyl-L-prolinamide was recrystallized with ethanol and ether to provide 600 mg. of the pure tripeptide having a melting point of 110° C. and which darkened at 235° C. and decomposed at 260° C. It's sulfate salt had a melting point of 100° C. but darkened at 200° C. and decomposed at 230° C.

EXAMPLE VII

Chromatographic values ($R_f$) of the peptides and protected peptides of the invention The chromatographic values ($R_f$) of the peptides and protected peptides of the invention in various solvent systems utilizing Silica Gel G as the adsorbent were determined and the results thereof are set forth below in Table I. In Table I below, A denotes a solvent system comprising n-butanol/glacial acetic acid/ethyl acetate/water at a respective ratio of 1:1:1:1;

B denotes a solvent system comprising n-propanol/30% ammonia solution at a respective ratio of 70:30; and, C denotes a solvent system comprising chloroform/methanol/30% ammonia solution at a respective ratio of 60:45:20.

TABLE I

[$R_f$ values of peptides and protected peptides on Silica Gel G]

| Peptides and protected peptides | $R_f$ values ($R_f \times 100$) in solvent systems | | |
|---|---|---|---|
| | A | B | C |
| BOC-His(Bzl)-Pro(NH$_2$) | 64 | 70 | |
| His(Bzl)-Pro(NH$_2$) | 30 | 54 | 85 |
| Cbz-Gln-His(Bzl)-Pro(NH$_2$) | 62 | 58 | 86 |
| Gln-His-Pro(NH$_2$) | 14 | 38 | 52 |
| Pyro Glu-His-Pro(NH$_2$) | 32 | 51 | 64 |

As can be seen from the above examples, L-glutaminyl-L-histidyl-L-prolinamide (IV) can be readily, chemically converted into L-pyroglutamyl-L-histidyl-L-prolinamide (V) by treatment with either hot glacial acetic acid, or hot alcoholic ammonia solution, or 0.1% acetic-n-butanol-pyridine solution.

In view of the above, it is believed that if the tripeptide, L-glutaminyl-L-histidyl-L-prolinamide were present in hypothalomic tissue, then the extraction and isolation procedures that have been disclosed and described by Schally et al. (A. V. Schally, C. Y. Bowers, T. W. Redding and J. F. Barrett, Biochemical, Biophysical Research Communication, vol. 25, p. 165 (1966); and A. V. Schally, T. W. Redding, C. Y. Bowers and J. F. Barrett, Journal of Biological Chemistry, vol. 244, p. 4077 (1969)), would have converted this L-glutaminyl compound into the L-pyroglutamyl compound which is chemically and biologically indistinguishable from the thyrotropin releasing hormone of the hypothalamus gland. This conversion of the L-glutaminyl compound to the L-pyroglutamyl compound as described in the present invention indicates that in the hypothalamic tissue, the L-glutaminyl compound, or a modification of it involving its free amino group, may be a biosynthetic precursor in the tissue to the L-pyroglutamyl compound. Alternatively, the L-glutaminyl-compound may be a metabolic transformation product of the L-pyroglutamyl-compound. These observations regarding the conversion of the L-glutaminyl-compound to the L-pyroglutamyl-compound indicate that the isolated TRH, which has been presumed to be the natural thyrotropin releasing hormone, may or may not be the naturally occurring thyrotropin releasing hormone in the hypothalamus gland. Consequently, the isolated TRH may be both the naturally occurring thyropin releasing hormone and also an artifact of isolation due to the unique organic chemistry of these two tripeptides and the conversion of one into the other.

What is claimed is:

1. A process for preparing the tripeptide, L-glutaminyl-L-histidyl-L-prolinamide comprising: coupling N-t-butyloxycarbonyl-N$^{im}$-benzyl-L-histidine, with L-prolinamide to obtain the dipeptide thereof; removing the N-t-butyloxycarbonyl protective groups from said dipeptide to obtain N$^{im}$-benzyl-L-histidyl-L-prolinamide; converting said N$^{im}$-benzyl-L-histidyl-L-prolinamide in the presence of triethylamine and chloroform followed by extraction and solvent evaporation to obtain N-carbobenzoxy-L-glutaminyl-N$^{im}$-benzyl-L-histidyl-L-prolinamide; and converting said last named compound by hydrogenation in ethanol to provide L-glutaminyl-L-histidyl-L-prolinamide.

2. A process for converting the tripeptide, L-glutaminyl-L-histidyl-L-prolinamide, to obtain the tripeptide, L-pyroglutamyl-L-histidyl-L-prolinamide, which comprises heating said L-glutaminyl-L-histidyl-L-prolinamide at reflux with a cyclizing medium selected from the group consisting of glacial acetic acid and alcohol-ammonia solution until said tripeptide has been converted to L-pyroglutamyl-L-histidyl-L-prolinamide which has the same hormonal activity and potency as the naturally derived thyrotropin releasing hormone of the hypothalamus gland of mammalian species.

3. A synthetic tripeptide having the structure:

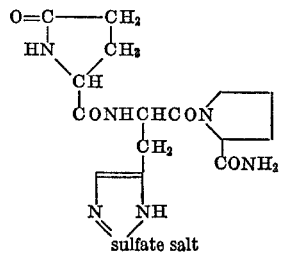

sulfate salt

References Cited

UNITED STATES PATENTS

| | | | |
|---|---|---|---|
| 3,093,627 | 6/1963 | Schwyzer et al. | 260—112.5 |
| 3,309,353 | 3/1967 | Boissmnas et al. | 260—112.5 |
| 3,341,510 | 9/1967 | Chillemi et al. | 260—112.5 |
| 3,374,218 | 3/1968 | Bernardi et al. | 260—112.5 |

OTHER REFERENCES

Burgus et al., C. R. Acad. Sci. Paris, Ser. D. 268, 2116–2118 (1969).

Burgus et al., C. R. Acad. Sci. Paris, Ser. D, 269, 226–228 (1969).

Guillemin, Pharmacology of Hormonal Polypeptides and Proteins, Bach et al. eds., Plenum Press, New York (1968), pp. 148–157.

Schally et al., Biochem. Biophys. Res. Commun 25, 165–169 (1966).

Schally et al., Recent Progress in Hormone Research 24, 510–525 (1968).

Pietta et al., Chem. Ber. 101, 3649–3651 (1968).

Handford et al., J. Org. Chem. 33, 4251–4255 (1968).

Folkers et al., Biochem. Biophys. Res. Commun 37, 123–126 (1969).

Schally et al., J. Biol. Chem. 244, 4077–4088 (1969).

ELBERT L. ROBERTS, Primary Examiner

U.S. Cl. X.R.

424—19, 177